United States Patent [19]
Motazed et al.

[11] Patent Number: 5,640,092
[45] Date of Patent: Jun. 17, 1997

[54] ELECTROMAGNETIC PIPE MAPPER FOR ACCURATE LOCATION AND DEPTH DETERMINATION

[76] Inventors: Behnam Motazed, 5703 Elmer St., Pittsburgh, Pa. 15232; Bryon Smith, 775 Wilkinsburg Ave., Pittsburgh, Pa. 15221; David White, 200 S. Millvale Ave., Pittsburgh, Pa. 15224

[21] Appl. No.: 280,706

[22] Filed: Jul. 26, 1994

Related U.S. Application Data

[63] Continuation-in-part of Ser. No. 7,408, Jan. 22, 1993, abandoned, which is a continuation of Ser. No. 829,012, Dec. 19, 1991, abandoned, which is a continuation-in-part of Ser. No. 589,088, Sep. 27, 1990, abandoned.

[51] Int. Cl.$^6$ .............. G01V 3/11; G01V 3/165; G01V 3/38; G01R 33/02
[52] U.S. Cl. .............. 324/326; 324/247; 324/335
[58] Field of Search .............. 324/67, 207.11, 324/207.17, 207.26, 232, 233, 247, 326, 329, 334, 335, 520, 529; 128/653.1, 654, 899

[56] References Cited

U.S. PATENT DOCUMENTS

| | | | |
|---|---|---|---|
| 2,642,477 | 6/1953 | Puranen et al. | 324/330 X |
| 2,744,232 | 5/1956 | Shawhan et al. | 324/329 |
| 3,299,351 | 1/1967 | Williams | 324/520 X |
| 3,991,363 | 11/1976 | Lathrop | 324/529 |
| 4,010,413 | 3/1977 | Daniel | 324/335 |
| 4,118,662 | 10/1978 | Weber | 324/326 |
| 4,186,338 | 1/1980 | Fichtenbaum | 324/529 X |
| 4,387,340 | 6/1983 | Peterman | 324/326 |
| 4,390,836 | 6/1983 | Bruce et al. | 324/326 X |
| 4,691,165 | 9/1987 | Szedlmajer | 324/326 |
| 4,812,812 | 3/1989 | Flowerdew et al. | 324/247 X |
| 4,837,489 | 6/1989 | McFee | 324/326 X |
| 4,896,117 | 1/1990 | Floweredew et al. | 324/529 X |
| 4,970,701 | 11/1990 | Kirkland | 324/67 X |
| 4,994,747 | 2/1991 | Stolarczyk | 324/334 |
| 4,998,059 | 3/1991 | Nigon et al. | 324/67 |
| 5,119,028 | 6/1992 | Mooney et al. | 324/326 |
| 5,194,812 | 3/1993 | Yokoi | 324/326 |
| 5,260,659 | 11/1993 | Flowerdew et al. | 324/326 |

OTHER PUBLICATIONS

"Development of Intelligent Pipe Locator"—pp. 217–222, 1986 Y. Miyamoto and Y. Wasa.

*Primary Examiner*—Gerard R. Strecker
*Attorney, Agent, or Firm*—Lucas & Just

[57] ABSTRACT

The device comprises a target signal transmitter to induce an electromagnetic signal in the hidden object, a position reference transmitter to transmit a signal for positioning purposes, a sensor unit to detect changes in the magnetic flux of the hidden object due to the induced electromagnetic signal and the positioning signal from the position reference transmitter, and a central unit to process and display a map of the hidden object. The initial processing of the data results in a gray-scale representation of the object, but additional data processing may be performed.

6 Claims, 5 Drawing Sheets

ELECTROMAGNETIC PIPE MAPPER FOR ACCURATE LOCATION AND DEPTH DETERMINATION

This is a continuation-in-part of application Ser. No. 007,408 filed Jan. 22, 1993, now abandoned, which was a continuation of application Ser. No. 829,012 filed Dec. 19, 1991, now abandoned, which was a continuation-in-part of application Ser. No. 589,088 filed Sep. 27, 1990, now abandoned.

The present invention relates to a device for the non-destructive mapping of concealed, cylindrical objects such as underground gas lines by active electromagnetic sensing. The mapper induces an electric current of known frequency into the underground object and detects the resulting magnetic field using a spherically shaped antenna.

The determination of the location and orientation of underground pipes or cables is essential to the maintenance and installation of utility networks. It is important that a damaged pipe or cable which is in need of repair be accurately located. It is also essential to locate undamaged pipes and cables which are in close proximity to the damaged one to avoid interfering with the undamaged ones during repair. Locating underground pipes and cables is also essential whenever excavation or performing other ground penetrating activities in order to avoid disturbing the underground objects.

Previous methods to locate these hidden objects have included destructive coring, exploratory excavation, lengthy and unreliable thermal induction, electrical resistance, Subsurface Interface Radar (SIR), localized characterization of the earth's magnetic field, and active electromagnetic induction. Magnetic detectors both active and passive are in common use.

Active electromagnetic sensing entails inducing an electric current in an object and then detecting or sensing the magnetic field that results from the induced electric current. Passive electromagnetic sensing entails detecting a magnetic field that emanates from an object due to signals induced in the object from ambient electromagnetic sources, such as radio transmissions or 50/60 Hz electric power signals. It is not practical to use passive electromagnetic sensing if such ambient sources are weak. Another form of passive sensing entails detecting a ferro-magnetic object by sensing the local perturbations caused by the object in the Earth's magnetic field.

Previous methods using active electromagnetic induction have used simple cylindrical antennas or sensors and have required the operator of the device to start from a known point, generally where the electric current is introduced into the cable, and trace the buried object. Typically, these active electromagnetic induction devices simply employ a single electric current with a single frequency. Additionally, the user of such known devices must perform a number of additional operations while collecting data, such as maintaining a constant sensor orientation, observing changes in the sensor's output signal, identifying and remembering where any fluctuation occurs, and inferring the position of the target line in light of the changes. Additionally, the operator of these systems must use a good deal of intuition to interpret the results which are scaled readings of the values of intensities of the magnetic field and are usually indicated as meter deflections or loudspeaker responses. The intensities of the magnetic field will vary depending on the location of the pipe and the orientation of the sensor.

The sensors that have traditionally been used for detecting induced signals are known as pipe and cable locators and consist of ferrite cylinders wrapped with coils of copper wire about the circumference of the cylinder. The magnetic flux in the vicinity of the target object induces a voltage into the sensor coils. The ferrite core increases the magnetic flux through the coils and therefore boosts the signal. The voltage induced in the coil is filtered to remove noise by filtering circuitry in the sensor. The induced voltage is also amplified by amplification circuitry in the sensor. The filtering and amplification circuitry of the sensor is conventional and well known to those of skill in the art. The signal strength is then shown on an analog meter or made available as a loudspeaker response.

The signal strength detected by the sensor is proportional to the magnetic flux flowing through the ferrite core of the sensor. Therefore, the sensor measures the magnitude of the magnetic field vector coincident with the sensor's axis. Because of this directional sensitivity of the sensor and the shape of the magnetic field around the target object, the sensor output varies according to the orientation and position of the sensor relative to the target object. Thus, the location of the target object may be determined by the fluctuations in the magnetic field intensity as indicated by the sensor as the sensor moves over the target object.

These traditional sensors are limited in that they measure only one component of the magnetic flux at a time. The traditional sensor must remain in a particular orientation with respect to the target object in order for the data to be interpreted.

Devices presently in use do not simultaneously characterize all components of the magnetic field surrounding the pipe, nor do they accumulate, display or retain data from a region of observation. These and other problems of the currently-used mappers have been solved by the present invention.

The subsurface mapper of the present invention is a position-tracked sensing system that is able to detect the location of objects which are hidden from sight of an unaided human eye. The mapper detects the hidden object by sensing, measuring, recording, and displaying the magnetic flux of an electromagnetic field which has been induced into the object. The mapper displays the signals received by a sensor as a gray-scale representation in real-time. This allows for immediate interpretation of the data representation, even while collecting additional data. Unlike previous devices, there is no requirement for the operator to maintain constant sensor orientation with respect to the target object nor is there any need for the operator to remember any fluctuations in sensor response while measuring a particular region. The mapper also provides the user with constant visual feedback as to the position of the mapper relative to the data map being collected.

The mapper of the present invention can determine the location and orientation of underground pipes or utility cables. In general, the device of the present invention may be used in any situation where the hidden object is capable of carrying an induced electromagnetic signal, i.e. an electrical current, and is in an environment wherein an electromagnetic signal may not be transmitted or is transmitted to a lesser degree, e.g. the finding of a ferrous pipe in a non-ferrous surrounding. The electrical conductivity as well as the magnetic permeability of the object to be located must be considered in terms of whether this method is reliable and useful in that application. In describing the device of the present invention, the reference of use will be set forth as the finding of ferrous cylinders such as pipes embedded within soil, but it will be understood that many other applications of the invention may be present, including the location of non-ferrous objects so long as the non-ferrous objects are capable of generating an induced magnetic field.

As used in the instant specification and claims, "target object" means the buried object which is being located and mapped. "Target area" means the area wherein the target object is believed to be located. The term "operator" as used herein is not limited to a human operator, nor is the mapper limited to being moved by a human operator. The mapper may be operated by, for instance, a mechanical mobile unit which is able to traverse the target area wherein the target object may be located.

The portable subsurface mapper of the present invention comprises: a target signal transmitter having means to transmit a complex electromagnetic signal which comprises a first and a second electromagnetic signal, said first and second electromagnetic signals inducing first and second magnetic fields, respectively, in the target object, wherein said first electromagnetic signal has a first frequency and said second electromagnetic field has a second frequency, said second frequency being greater than said first frequency, and wherein said second electromagnetic signal consists of a pulse of one period of said second frequency transmitted once each period of said first frequency; a sensor unit for detecting both said first magnetic field and said second magnetic field and generating data with respect to the detected first magnetic field and second magnetic field; and a central unit for processing the data generated by said sensor unit and conveying to a user the location of the hidden object. The second electromagnetic signal is transmitted as a timing pulse once each period of the first electromagnetic signal.

Preferably, the device of the present invention further comprises a position reference transmitter for transmitting a position reference signal to said sensor unit, and said sensor unit further comprises a means for detecting the position reference signal.

In another embodiment of the present invention, the device comprises: a target signal transmitter for inducing at least two magnetic fields into the target object at different frequencies; a position reference transmitter for transmitting a position reference signal; a sensor unit for detecting both said magnetic fields from said object and said position reference signal, and generating data with respect to the detected magnetic field and the detected reference signal; and a central unit for processing the data generated by the sensor unit and conveying to a user the location of the hidden object.

In the preferred embodiment, in order to locate a target object beneath the ground surface, the target signal transmitter is positioned to induce a complex signal comprising two electromagnetic signals of different frequency into the target object, either by direct connection or by remote induction. The sensor unit scans over the target area, receiving magnetic field data from the electromagnetic signals induced in the target object by the target signal transmitter. The data are then initially processed by circuitry in the sensor unit. The processed data are then communicated to the computer as electromagnetic data. The sensor data and the position data are further processed in the computer in a conventional manner to produce a spatially correlated data array showing both the position of the sensor unit and the intensity of the magnetic field sensed by the sensor unit. The data array is shown on the display of the central unit as a gray-scale representation with the current sensor position highlighted. Additional processing of the data may be performed in order to resolve the data further.

The target signal transmitter can induce the electromagnetic signals either by direct connection to the target object or by remote induction of a signal in the target object. Which type of induction method to use is determined by the accessibility of the target object. If a portion of the target object is accessible, direct connection can be used. If the target object is inaccessible, remote induction is used.

Direct connection is when an electrically conductive connection is made between the transmitter and an exposed portion of the target object in any conventional manner. Remote induction is when the transmitter is positioned above the target object such that an antenna in the transmitter is parallel with the longer axis of the target object. When the transmitter transmits a signal, the antenna generates an electromagnetic field which penetrates the ground and travels along the target object. Such pieces of equipment are conventional.

Because of the strength of the electromagnetic fields produced both by direct and remote induction, it is preferred that the transmitter be located about three to five meters away from the target mapping area.

The frequency of both electromagnetic signals of the complex signal emitted by the target signal transmitter should be sufficient to induce a large enough magnetic field for detection by the sensor unit. The frequencies will vary depending on the material of the target object and the external environmental conditions. It has been found that an actively applied signal of from about 5 kHz to about 10 kHz works satisfactorily for the frequency of the first electromagnetic signal and about 50 kHz to about 200 kHz for the frequency of the second electromagnetic signal. It is preferred to use a signal of about 10 kHz for the frequency of the first electromagnetic signal and about 100 kHz for the frequency of the second electromagnetic signal. The ratio of the frequency from the first electromagnetic signal to the second electromagnetic signal is about 1:2 to about 1:20.

A position reference transmitter can be set up near or in the target area. The position reference transmitter sends a signal to a sensor means for detecting the signal from the position reference transmitter. The sensor means is located in the sensor unit. The position reference transmitter transmits a position reference signal to the sensor unit and the sensor unit has a means for detecting the position reference signal.

When the position transmitter is used, it remains stationary during the mapping operation. The location and orientation of the position reference transmitter define the target area over which sensor data is taken and the coordinate frame into which the data will be rotated. During the mapping operation, the position and orientation of the sensor unit are measured in relation to the position reference transmitter.

The position reference transmitter is selected from the group consisting of magnetic position reference transmitter, acoustical position reference transmitter, microwave position reference transmitter, and laser position reference transmitter. Preferably, the position reference sensor is laser based.

The means for detecting the position reference signal or the position reference transmitter is conventional and usually sold in conjunction with the position reference transmitter as a positioning system. The positioning system is conventional and performs conventional operations as part of the subsurface mapper. A suitable brand of positioning system for use in the present invention is a laser based positioning system made by Spatial Positioning Systems Inc.

The sensor unit contains a spherical electromagnetic antenna for detecting said first magnetic field, a phase signal antenna for detecting said second magnetic field and preferably a means for detecting the position reference signal. The means for detecting the position reference signal will depend on the type of signal transmitted by the position reference transmitter and is selected to corresponded with the type of position reference transmitter being used.

The sensor unit also contains a microprocessor for processing the signals received and communicating the processed signals to the central unit's computer.

The spherical electromagnetic antenna is used for detecting the first magnetic field. The spherical electromagnetic antenna allows for sensing of the magnetic field in three axes. This spherical electromagnetic antenna completely characterizes the magnetic field of the signal of the target object by measuring all three of the orthogonal vector components simultaneously and at the same position.

The spherical electromagnetic antenna of the present invention comprises a solid ferrite ball with copper windings about all three orthogonal axes. The number of windings about the ball and the size of the wire used for the windings are selected to tune the sensor to the frequency of the first electromagnetic signal of the complex signal transmitted by the target signal transmitter. This tuning of the sensor to the frequency of the first electromagnetic signal is calculated and implemented in accordance with standard electromagnetic principles. It has been found that if the frequency of the first electromagnetic signal is 10 kHz, the number of windings about each axis is suitably 1000 to 2000 and, preferably, 1500 windings. The size of the wire used for this frequency is suitably 40 to 48 gauge and, preferably, 42 gauge. The ideal frequency for the transmitted signal varies depending on the material of the object being located and its external surroundings. Suitably, the frequency of the actively applied signal ranges from 1 kHz to 150 kHz. For most situations, a frequency from 8 kHz to 12 kHz is preferable, and a 10 kHz signal is most preferable. The target signal transmitter and the sensor unit of the present invention are preferably tuned to 10 kHz as the first electromagnetic signal.

The spherical antenna is the front end of an electronic circuit which is designed to filter through only the signal having the lower frequency, i.e. the first signal. Thus, a clean signal of only the first frequency is induced in each of the three coils and is measured by the spherical antenna as resulting from the magnetic field induced by the first electromagnetic signal. Each coil in the spherical antenna measures the magnitude of one component of the first induced magnetic field vector. The spherical antenna, through conventional circuitry, transfers the value of the magnitude of the voltage of each coil in analog form to a signal processing board. The spherical antenna and the signal processing board are in the sensor unit as well as conventional filtering and amplification circuitry.

The phase signal antenna detects the second magnetic field and is preferably a pair of cylindrical electromagnetic antennas. The cylindrical antennas are arranged orthogonally with respect to one another, parallel to the plane of the target area, and with their center points on a line that is perpendicular to the plane of the target area.

Cylindrical antennas suitable for the present invention are conventional and typically comprise a ferrite rod with a fixed number of copper wire windings around the rod. The number of windings and the gauge of the wire are calculated to be in tune with the frequency of the second electromagnetic signal in the target object. Preferably, a ferrite rod of 1 cm diameter and 4 cm length is wound with copper wire of 36 to 40 gauge to obtain 1000 to 2000 windings for a frequency of between about 50 and 200 kHz. Similar to the spherical antenna, the phase antenna is designed to filter through only the second signal of higher frequency. Therefore the phase signal antenna detects only the second signal which occurs once each period of the first frequency. When using 10 kHz and 100 kHz as the respective first and second frequencies, the net result detected by the phase signal antenna is a signal that, every 1/1000 second (the period of a 10 kHz signal), contains a 100 kHz cycle. The 100 kHz cycle is thus used as a timing pulse. Circuitry in the sensor unit uses this timing pulse to create a signal which corresponds to the frequency whose period is the same as the time between timing pulses. This period is the period of the first signal. The circuitry, therefore, creates an emulated first signal derived from the detected second signal. This emulated first signal is therefore the same as the transmitted first signal, which allows for a phase comparison of the induced and transmitted signals, as discussed below.

The first signal and the emulated first signal are sent to the microprocessor of the sensor unit. By comparing the phase of the first signal with the phase of the emulated first signal, the sensor is able to determine which side of the pipe it is on.

It is an electromagnetic phenomenon that an induced signal in an antenna coil as compared to a transmitted signal changes phase when the main axis of the coil transitions from one side to the other of a buried conductor. Therefore, the first (induced) signal in the antenna coil is in phase with the emulated (transmitted) signal on one side of the buried conductor, while it will be 180° out of phase once it is moved to the other side of the conductor. When the antenna is directly above and perpendicular to the conductor, no signal is induced in the antenna, thus the phase is undetermined.

The reason behind this change in phase has to do with the direction of the magnetic field vectors coming out of or going in to the ground. In the present invention, positive and negative signs are assigned during the phase comparison in the following manner. When the antenna is on one side of the conductor, if the first signal in the antenna and the emulated signal are in phase, then it is assumed that the magnetic field vector is coming out of the ground, thus the vertical component of the vector is positive, and a positive sign is assigned to any magnitude reading. When the two signals are out of phase by 180°, the vector is presumed to be going into the ground and therefore its vertical component is negative and a negative sign is assigned. This occurs when the antenna transitions to the other side of the conductor. Because of the existence of the emulated first signal, the phase comparison is able to be made between the induced (first) signal and the transmitted (emulated) signal. This avoids any fluctuations in the readings of the induced field due to changes in amplitude and direction, as is common with conventional mappers.

By comparing the phase of the emulated signal with the phase of the first signal detected by the spherical antenna, comparing the correspondence of the phases, and assigning a positive or negative sign depending whether or not the phases correspond, the sensor circuitry applies a magnitude and a sign to each measured field component. This allows the device to determine which side of the underground object it is on.

On the signal processing board, the three signals generated for each sensor position (one from each coordinate axis) are filtered, amplified and compared for phase. The three normalized analog voltages are then digitized and made available as signed integers at the board's serial communications port.

Alternatively, the three normalized analog voltages are digitized and made available as unsigned integers at the board's serial communications port and the three phase angles are digitized and made available as unsigned integers at the same port.

It is important to note that the field vector measurements are made with respect to the coordinate system that is coincident with the spherical antenna. This coordinate frame depends on the orientation of the conductors wound around the ferrite ball. As the orientation of the sensor changes, so does the orientation of this coordinate system. To avoid the requirement for maintaining the sensor in a constant orientation, the field measurements are taken at arbitrary orientations, and then the data are rotated into a common, local coordinate frame. The operations systems for rotating data in this manner are conventional and well known to those of skill in the art.

The central unit comprises a computer, a permanent memory storage device, a display, a keyboard, and a power source. The computer controls the data collection and desired processing of the data. The computer is conventional and performs conventional operations on the specific data. A suitable brand of computer for use in the present invention is the Megatel Quark PCII. The computer contains and controls the ports in communication with the sensor unit, the function keys of the keyboard, the disk drive, and the loudspeaker. The computer also contains conventional graphics electronics which control the display and allow the position and electromagnetic data to be displayed as the gray-scale representation. The graphics electronics are part of the Megatel Quark PCII. The computer can also support an optional full keyboard and optional headphones which can provide an audio feedback alternative to the speaker during selected sensing modes. Alternative computers such as the Agilis™ 11P0 or 22P3 or the Gespac MPL-4079 are suitable for use in the present invention, but would require external graphics electronics similar to those which are part of the Megatel Quark PCII.

The display may be any type of display which can display gray-scale representation and is visible in bright sunlight to allow the invention to be used outside. Applicant has found that a liquid crystal display with graphics capabilities has good resolution and low power consumption, can display the gray-scale representation in a satisfactory manner, and is visible in bright sunlight. A suitable display is the KL6440GSR-FW from Kyocera America, Inc. Other displays, such as liquid crystal flat panel displays available from Sharp Electronics Corp. or Panasonic Industrial Company, are suitable for use in the present invention.

The keyboard that is incorporated into the central unit is a limited type of keyboard with enough keys to control the operation of the system. The keyboard consists of membrane switches arranged linearly and positioned across the bottom of the display. This allows key labels and functions to be shown on the display, since the function controlled by each key changes, depending on the state of the system. Applicant has found that five keys are generally sufficient to provide enough versatility for use during operations. Membrane switch keypads such as those sold by Bergquist Switch Inc. or Lucas Duralith Corporation are suitable for use as part of the present device. The optional full-size keyboard will provide access to extended, more technical operations of the system such as software development or troubleshooting. Any keyboard that meets the specific requirements of the computer is suitable for use with the present invention. If the brand of computer used is the Megatel Quark PCII, any IBM PC-compatible keyboard, such as the Microtype available from Mechanical Enterprises Inc. or the ZEOS/RS available from Zeos International, Ltd., is suitable for use with the present invention.

The permanent storage device boots the computer and allows for storage of the collected data for any desired delayed post-processing or for transfer to another computer. The drive and drive media may be any that are sufficient to perform these functions in the environment where the present invention is to be used. Applicant has found that static RAM cartridge drives perform well for the required functions. Suitable RAM drives include those sold under the names ThinCard™, available from Databook Inc., and BC Reader/Writer, available from Mitsubishi Plastics Industries Limited. Suitable RAM cartridges depend on the drive chosen and include those sold under the names Melcard, available from Mitsubishi Electric Corporation, Beecard, available from Mitsubishi Plastics Corporation, or ThinCard™, available from Databook Inc. Preferable RAM drives include those that comply with PMCIA standards and specifications.

The position and magnetic field data are received by the sensor unit and the central unit while mapping the target area. Initial processing of that data is performed by the sensor unit and the computer to extract the details required to determine the location and orientation of the target object. The computer receives both position and electromagnetic data from the sensor unit, correlates the data, and displays in real-time a position icon and a gray-scale representation showing the degree of magnetic flux recorded by the sensor. The position icon is generated in a conventional manner using the position signal from the position reference transmitter.

To show the data in the form of a gray-scale representation, conventional graphics electronics and software are used to convert the data received from the sensor. The display is divided into a number of cells. As the sensor completes its traversal over the portion of the target area represented by a particular cell in the display, the position icon moves out of the cell and the empty cell is replaced with a gray block which represents the sensor response in that area. Once the sensor operation is complete over the entire target area, the data map shown by the cells of the display is completely filled. Each pixel on the gray-scale representation can display one of sixteen gray levels, covering the range from darker to brighter. Cells in the display corresponding to areas of large values of magnetic flux are of bright-colored regions and the cells corresponding to lower values are darker. When mapping data is represented in this way, bright-colored areas in the representation roughly correspond to the location of the target object.

Alternatively, large values of magnetic flux could be represented as dark-colored regions and small values of magnetic flux could be represented as bright-colored regions, in which case the dark-colored areas in the representation would roughly correspond to the location of the target area.

At this point in the processing of the data, the gray-scale representation can show the preliminary location and orientation of any target object present and this preliminary information may be sufficient to enable location of the target object.

However, it is generally considered desirable to perform additional processing of the data in order to highlight subtle features in the data set not illustrated by the gray-scale representation. This additional processing also allows for an estimation of the depth of the target object.

Conventional image enhancement, thresholding and skeletonizing operations are applied to the pixel-digitized gray-scale representation, generating binarized chains of line-like features. The image enhancement of the data performs conventional operations on the data such as quantization of the magnetic images and transformations of the image.

Also conventional is the segmentation of the image data by thresholding. It has been found that simple brightness thresholding produces satisfactory results in resolving the data.

A depth estimation algorithm performs operations on segment chains to infer the depth of the hidden object. Segment chains are selected that are roughly perpendicular to the axis of the target object. For each pixel in the chain, a normal vector is constructed to the magnetic vector represented by the pixel. As shown in FIG. 6, the intersection of these normal vectors corresponds to the center of the hidden object, from which the depth can be calculated.

One depth estimate is provided for each pair of pixels (vectors) selected. The depth estimate is refined by performing the operation on several pixel pairs and averaging the results. This depth estimation algorithm is suitable for use only on signed magnetic field measurements, such as those provided by the sensor of the present invention. If the algorithm is applied to unsigned data, as available from conventional pipe and cable locators, the normal lines will not always intersect, as shown in FIG. 7.

Any power source which is sufficient to run the central unit may be used. Applicant has found that batteries are convenient due to the mobility of the unit. A battery pack can be carried by the deployment apparatus or worn by a human operator.

The sensor unit is connected to the central unit with a cable to allow for transfer of communication information and power. Conventional radio transmitters and receivers may also be used to connect the sensor unit to the central unit.

The present invention may be more fully understood with reference to the following drawing figures wherein.

Figure 1:
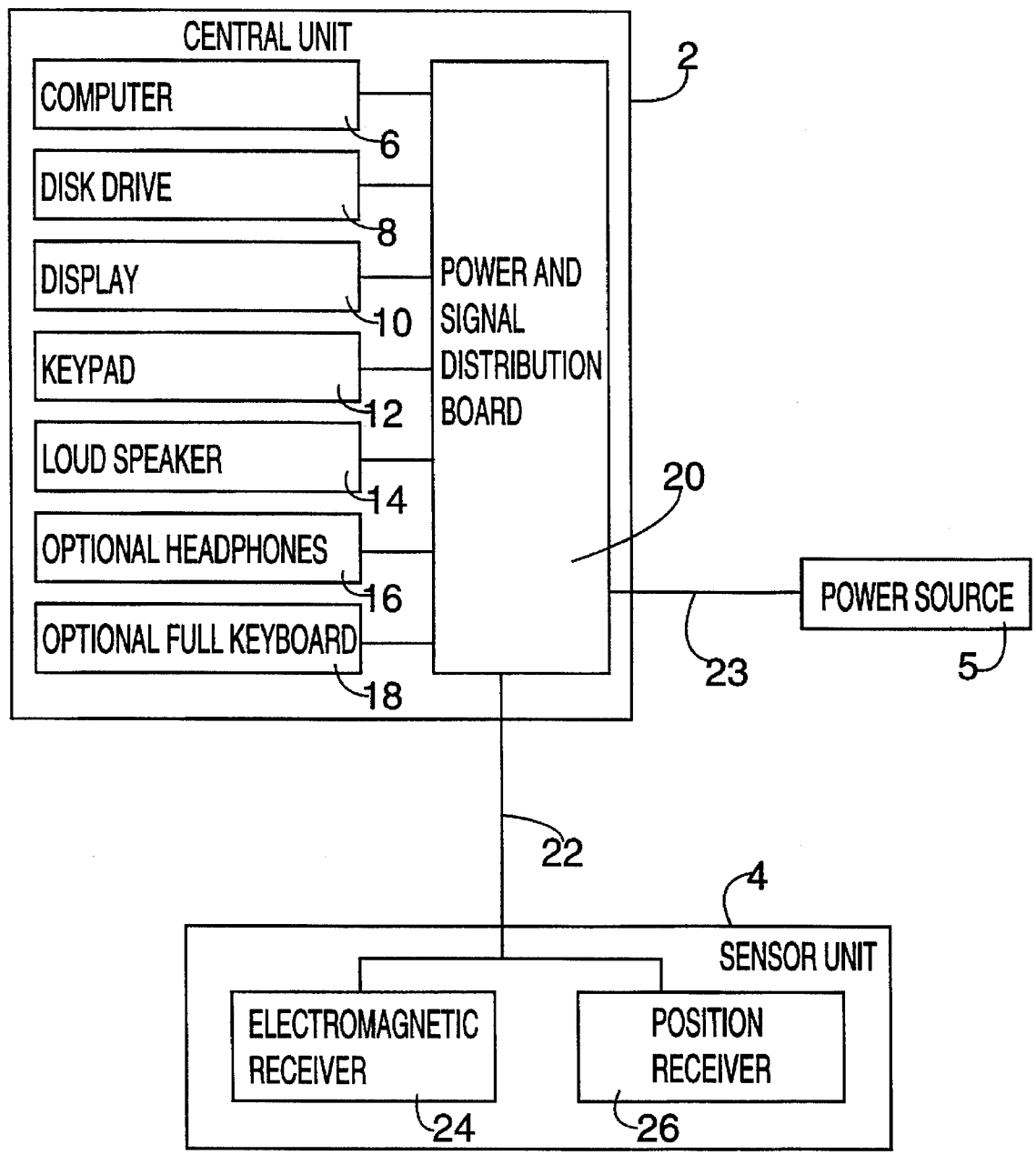
FIG. 1 shows the central unit and the sensor unit of the mapper of the present invention.

FIG. 1 shows the components of the central unit 2 and the sensor unit 4 and the power source 5. The computer 6, disk drive 8, display 10, keypad 12, loudspeaker 14, optional headphones 16, and optional full keyboard 18 are shown connected to power and signal distribution board 20 of the central unit 2.

Sensor unit 4 is connected to central unit 2 by means of cable 22 and power source 5 is connected to central unit 2 by cable 23. The electromagnetic receiver 24 is shown along with position receiver 26. The electromagnetic receiver comprises the two electromagnetic sensors and the circuitry for processing the electromagnetic sensor data.

Figure 2:
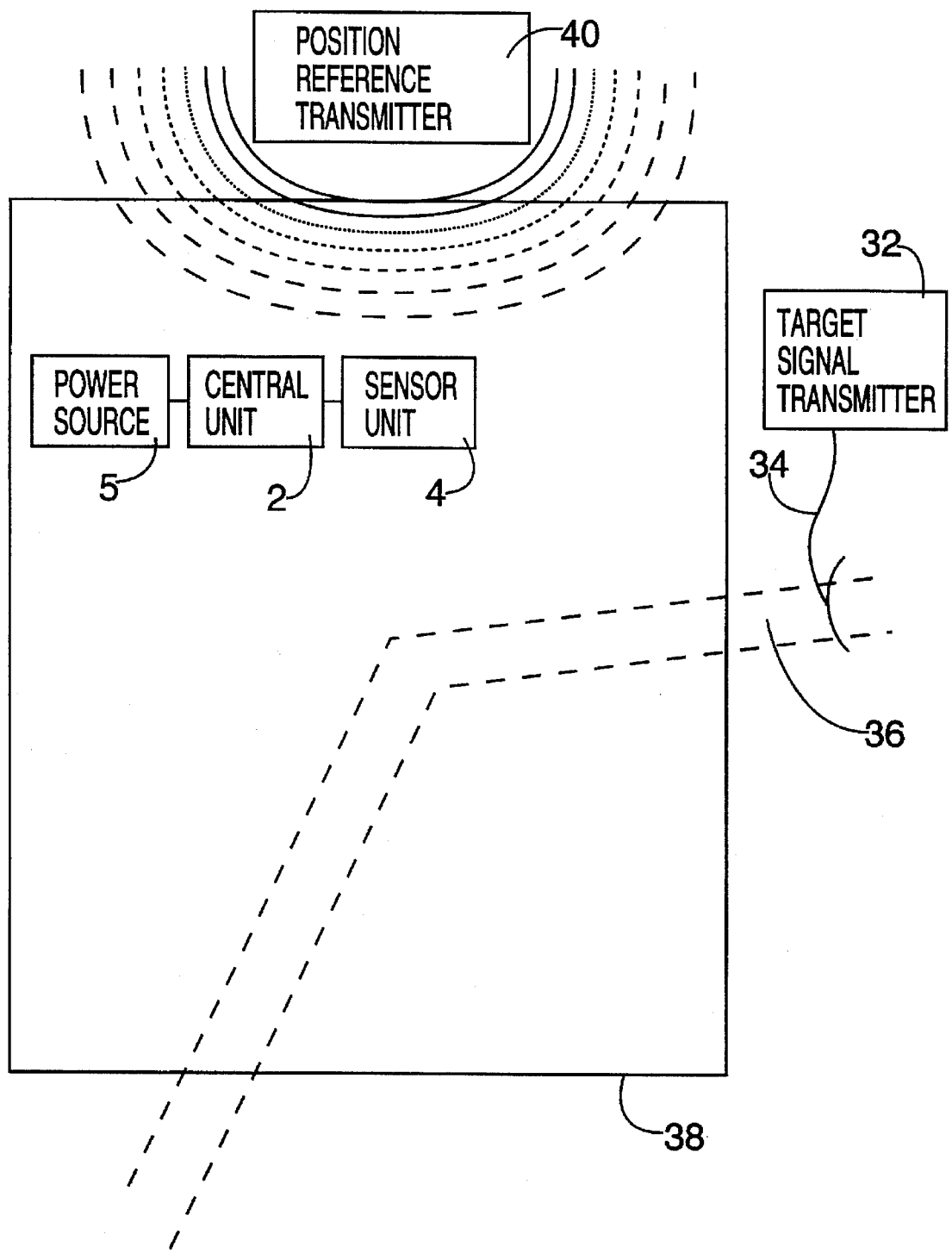
FIG. 2 shows the mapper of the present invention in position for location of a target object.

FIG. 2 shows all of the components of the subsurface mapper in position for mapping. Target signal transmitter 32 is connected by means of electrically conductive connection 34 to target object 36. Target object 36 is located in target area 38. Position reference transmitter 40 is located just outside target area 38 and is set to emit the positioning signal. The central unit 2 and sensor unit 4 are in position to begin covering the target area 38 in order to locate target object 36.

Figure 3:
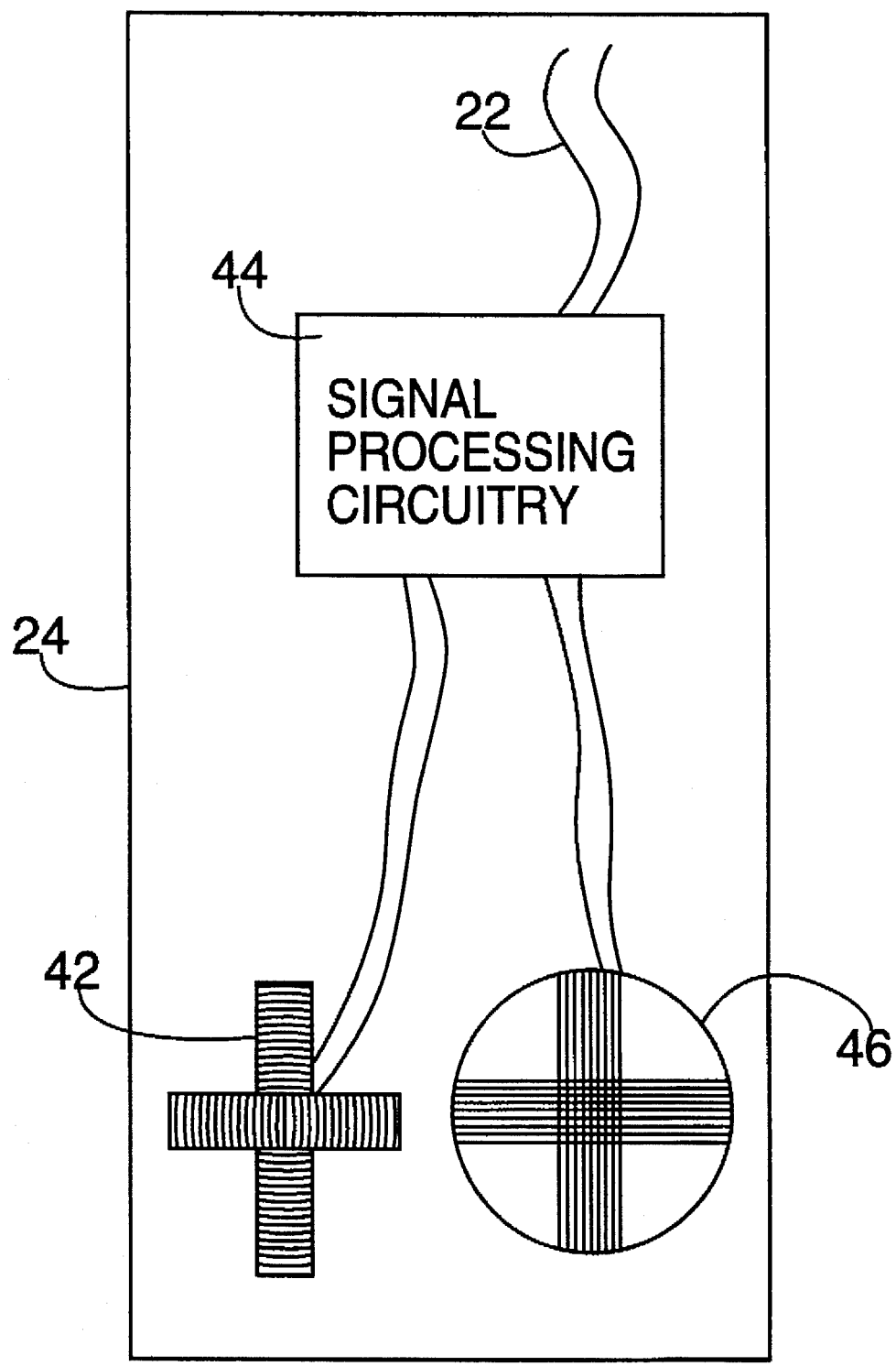
FIG. 3 is a more detailed drawing of the electromagnetic receiver of the sensor unit of the mapper of the present invention.

FIG. 3 is a more detailed drawing showing the electromagnetic receiver 24. As shown in FIG. 3, phase signal antenna 42 is connected to signal processing circuitry 44. Signal processing circuitry 44 is circuitry which amplifies and filters noise from the phase signal antenna 42. The signal processing circuitry 44 also emulates the first signal by determining the period of time between timing pulses, determining which frequency has a period of that length of time, and creating such a frequency. All this circuitry is conventional.

The spherical electromagnetic antenna 46 is also connected to signal processing circuitry 44. Signal processing circuitry 44 also amplifies and filters noise from the signal from the spherical antenna 46.

The emulated signal and the first signal are then sent to the microprocessor. At the microprocessor, the phases of the first and emulated signals are compared for phase correspondence. The magnitude of the first signal (in each axis) is digitized and signed according to the phase determined and made available to the central unit over the connector to the central unit 22.

Figure 4:
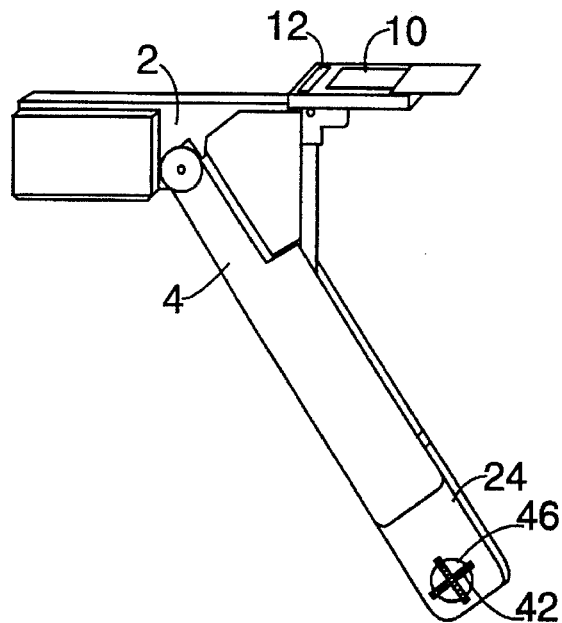
FIG. 4 illustrates a central unit and a sensor unit combined into a hand-held device.

FIG. 4 illustrates central unit 2 and sensor unit 4 in a portable configuration. The portable pipe mapper as shown in FIG. 4 has central unit 2 which is connected to sensor unit 4. Central unit 2 has display 10 and 5 button keypad 12. Sensor unit 4 has electromagnetic receiver 24 with phase signal antenna 42 and spherical electromagnetic antenna 46.

Figure 5:
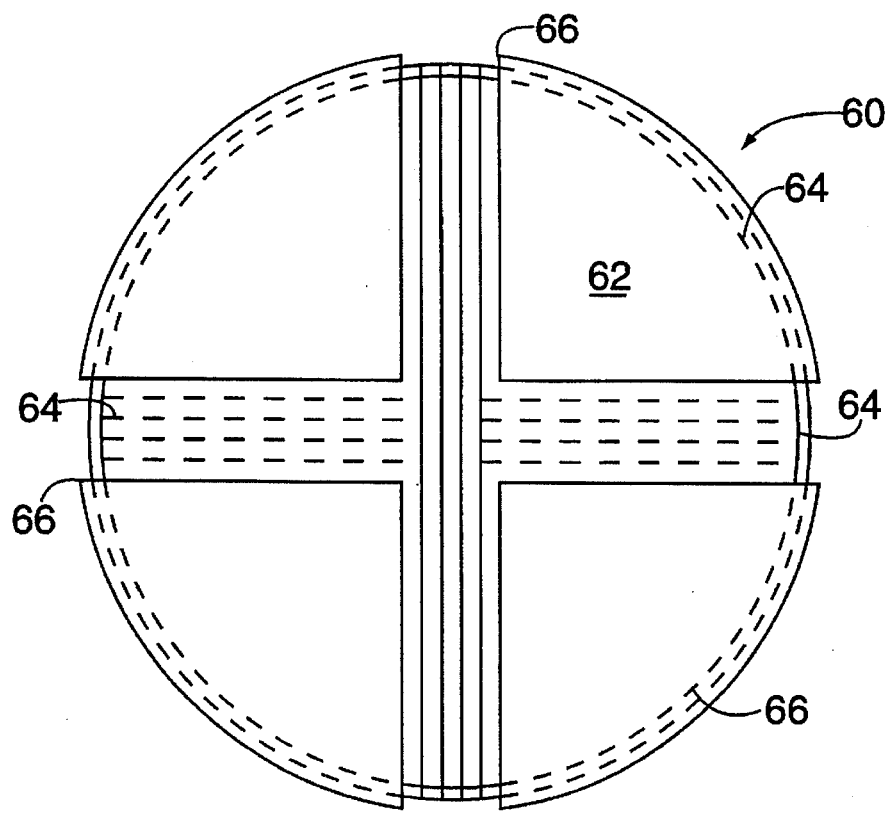
FIG. 5 illustrates a spherical antenna in accordance with the present invention.
Figure 6:
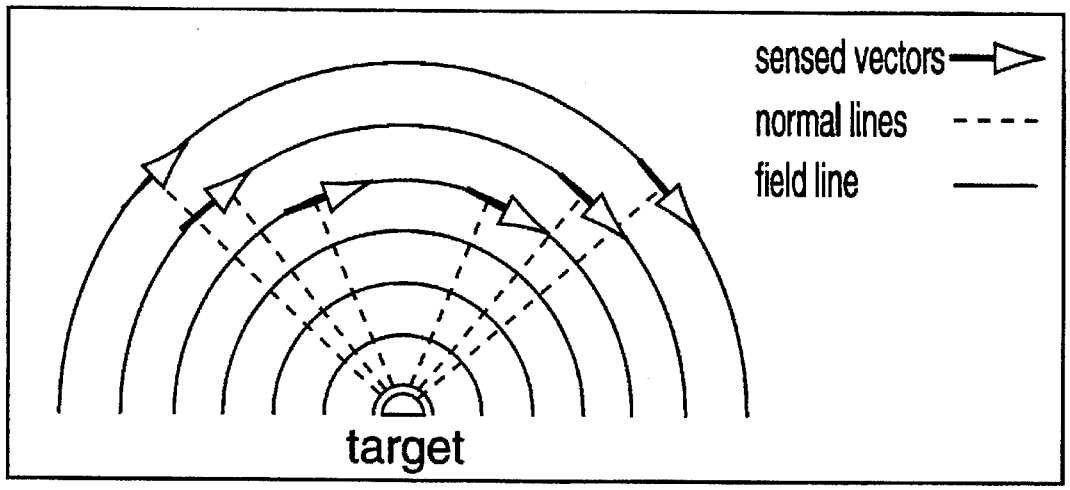
FIG. 6 illustrates a depth estimation operation applied to signed data from the present invention.
Figure 7:
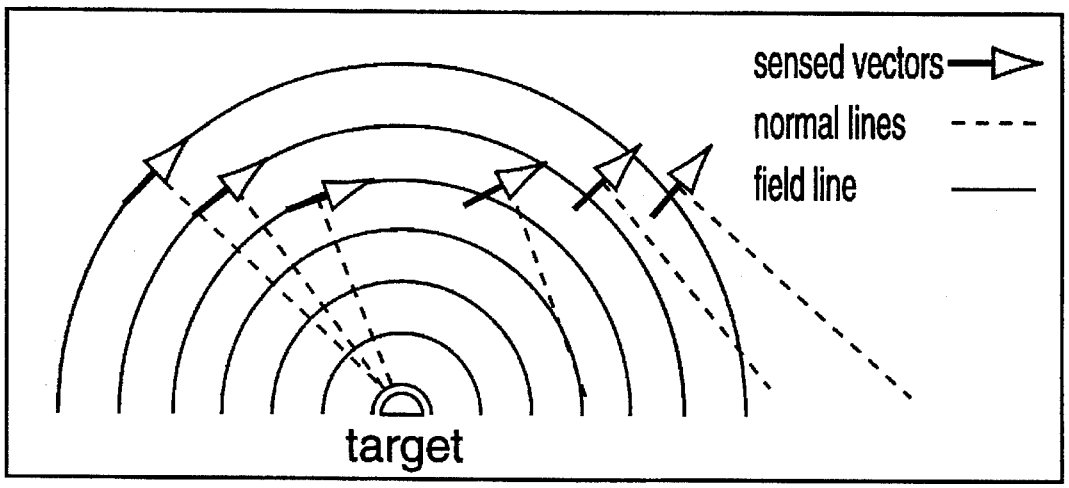
FIG. 7 illustrates a depth estimation operation applied to unsigned data from a conventional locator.

FIG. 5 illustrates a preferred spherical antenna 60 made in accordance with the present invention having ball 62 with windings 64 in three orthogonal axes therearound. Channels 66 have been made in the ball to accommodate the windings.

In a preferred embodiment, FIG. 3, the spherical and the cylindrical antennas are located adjacent to each other and about 2.5 cm apart.

Good results have been obtained where, instead of the target signal transmitter inducing a second magnetic field and using the second magnetic field to emulate the first signal, radio waves or some other conventional electromagnetic waves are used to send a second signal to the sensor unit. In the case of radio waves, the phase signal antenna is then replaced by a conventional radio wave receiver and antenna combination. In this case, the target signal transmitter does not transmit a complex signal comprised of first and second electromagnetic signals of different frequency, but transmits only a first electromagnetic signal. The radio transmitter transmits a second signal of a frequency higher than the first signal once each period of the first signal. The radio receiver in the sensor unit receives the second signal. Emulation of the first signal from the second signal and all other data processing is then performed in the same manner as described above with respect to the preferred embodiment.

In another alternative, both the target signal transmitter and the sensor unit have a transmitter and receiver, respectively, which are compatible with each other, e.g. radio transmitter and receiver. The sensor unit still uses the second signal to emulate the first signal and compares the emulated first signal to the first magnetic signal.

It will also be appreciated by those in the medical profession that the device of the present invention can be used to determine the location and orientation of cylindrical objects located in the human body and invisible to the naked eye. Such is possible if the hidden object is capable of having a magnetic field emanating therefrom.

It will be understood that the claims are intended to cover all changes and modifications of the preferred embodiments of the invention herein chosen for the purpose of illustration which do not constitute a departure from the spirit and scope of the invention.

What is claimed is:

1. A system for detecting hidden cylindrical objects wherein said cylindrical object is capable of carrying an induced electric current, said system comprising:

(a) a target signal transmitter connected to said cylindrical object, said target signal transmitter inducing a first electric current and a second electric current in said cylindrical object, said second electric current having a frequency greater than the frequency of said first electric current such that said second electric current acts as a timing pulse for said first electric current by occuring once each period of said first electric current, said first electric current creating a first magnetic field which emanates outward from said cylindrical object and has said cylindrical object as a center for said first magnetic field and said second electric current creating a second magnetic field which emanates outward from said cylindrical object and has said cylindrical object as a center for said second magnetic field;

(b) a position reference transmitter located near said cylindrical object, said position reference transmitter transmitting a position reference signal; and (c) a portable mapping device comprising:

(c)(1) a sensor unit for detecting said first and second magnetic field and said position reference signal and for generating data with respect to said detected first and second magnetic field and said position reference signal, said sensor unit comprising:

(c)(1)(i) a spherical antenna mounted in said sensor unit, said spherical antenna being a solid ferrite ball with copper wire windings wound around all three orthogonal axes of said ball, said copper wire windings being tuned to the frequency of said first electric current such that said first magnetic field creates a first signal in said spherical antenna;

(c)(1)(ii) a phase signal antenna mounted in said sensor unit adjacent to said spherical antenna, said phase signal antenna being a pair of cylindrical electromagnetic antennas arranged orthogonal to one another, each of said cylindrical electromagnetic antennas being a ferrite rod with copper wire windings wound around said ferrite rod, said copper wire windings being tuned to the frequency of said second electric current such that said second magnetic field creates a second signal in said phase signal antenna;

(c)(1)(iii) a position reference receiver means for receiving said position reference signal, said position reference receiver means mounted in said sensor unit, said position reference receiver means creating a third signal after receiving said position reference signal;

(c)(1)(iv) signal processing means for processing said first, second and third signals, said signal processing means mounted in said sensor unit, said signal processing means using said second signal to create an emulated first signal, said emulated first signal imitating the frequency and wave pattern of said first electric current, said signal processing means comparing the phase of said emulated first signal to the phase of said first signal to determine which side of said object said sensor unit is on and generating data from said first, second and third signals; and (c)(2) a central unit connected to said sensor unit, said central unit comprising a computer for processing data obtained from said sensor unit and conveying to a user the location of the cylindrical object.

2. The system of claim 1 wherein said copper wire windings on said spherical antenna are tuned to the frequency of said first electric current by having said copper wire windings wound around each of said orthogonal axes about 1000 to 2000 times, and said copper wire having a gauge of about 40 to 48.

3. The system of claim 1 wherein said copper wire windings on said phase signal antenna are tuned to the frequency of said second electrical current by having said copper wire windings wound around each of said ferrite rods about 1000 to 2000 times and said copper wire having a gauge of about 36 to 40.

4. The system of claim 1 wherein the frequency of the first electric current is about 10 KHz and the frequency of the second electric current is about 100 KHz.

5. The system of claim 1 wherein said position reference transmitter is selected from the group consisting of magnetic position reference transmitter, acoustic position reference transmitter, microwave position reference transmitter and laser position reference transmitter.

6. A system for detecting hidden cylindrical objects wherein said cylindrical object is capable of carrying an induced electric current, said system comprising:

(a) a target signal transmitter connected to said cylindrical object, said target signal transmitter inducing an electric current in said cylindrical object, said electric current creating a magnetic field which emanates outward from said cylindrical object and has said cylindrical object as a center for said magnetic field, said target signal transmitter having a radio wave transmitter which transmits a radio wave having a frequency higher than said electric current such that said radio wave acts as a timing pulse for said electric current by occuring once each period of said electric current;

(b) a position reference transmitter located near said cylindrical object, said position reference transmitter transmitting a position reference signal; and (c) a portable mapping device comprising:

(c)(1) a sensor unit for detecting said radio wave, said magnetic field and said position reference signal and for generating data with respect to said detected magnetic field, said radio wave and said position reference signal, said sensor unit comprising:

(c)(1)(i) a spherical antenna mounted in said sensor unit, said spherical antenna being a solid ferrite ball with copper wire windings wound around all three orthogonal axes of said ball, said copper wire windings being tuned to the frequency of said electric current such that said magnetic field creates a first signal in said spherical antenna;

(c)(1)(ii) a radio wave receiver mounted in said sensor unit for receiving said radio wave, said radio wave receiver creating a second signal after receiving said radio wave;

(c)(1)(iii) a position reference receiver means for receiving said position reference signal, said position reference receiver means mounted in said sensor unit, said position reference receiver creating a third signal after receiving said position reference signal;

(c)(1)(iv) signal processing means for processing said first, second and third signals, said signal processing means mounted in said sensor unit, said signal processing means using said second signal to create an emulated electric current signal, said emulated electric current signal imitating the frequency and wave pattern of said electric current, said signal processing means comparing the phase of said emulated electric current signal to the phase of said first signal to determine which side of said object said sensor unit is on and generating data from said first, second and third signals; and (c)(2) a central unit connected to said sensor unit, said central unit comprising a computer for processing data obtained from said sensor unit and conveying to a user the location of the cylindrical object.

* * * * *